United States Patent Office 3,006,898
Patented Oct. 31, 1961

3,006,898
PRODUCTION OF POLYMERIC UREAS
Henry A. Walter, Longmeadow, Mass., assignor to Monsanto Chemical Company, St. Louis, Mo., a corporation of Delaware
No Drawing. Filed Dec. 30, 1957, Ser. No. 705,743
7 Claims. (Cl. 260—77.5)

The present invention relates to the production of polyamides and more particularly to production of polymeric aliphatic and aromatic ureas.

In general, polyamides, which are inclusive of polyureas, when utilized in polymeric form, find various and valuable applications as moldings, coatings, fibers, films and the like. The polyureas, particularly polymeric polyalkylene ureas having the general formula:

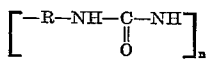

wherein R is a bifunctional organic radical, and $n$ is greater than 1, are known to exhibit attractive properties when so utilized. However, to date their utilization has been restricted because of the expense accompanying their production, and the inability of attaining materials in polymeric form exhibiting desirable amounts of fusibility. Illustrative of the processes used to produce polyureas is that contained in U.S. 2,708,617, directed to reacting diisocyanates with diamines and by reaction of phosgene with diamines.

Accordingly, it is a principal object of the present invention to provide a process by which to produce improved polymeric ureas.

Another object is to provide a process by which to produce polymeric polyureas in fusible form.

Other objects of the invention will in part be obvious and will in part appear hereinafter.

These and other objects are attained by providing a reaction medium containing cyanic acid and a polyamine and interreacting the cyanic acid and polyamine.

The following examples are given to illustrate the invention. Where parts are mentioned, unless otherwise described, parts by weight are intended.

Example I

A 3-liter round-bottomed double necked flask provided with a condenser is charged with 116 grams of 1,6-hexamethylene diamine contained in 15 times its volume of dry benzene. To this 91 grams of N-methyl-N-nitroso urea is gradually charged over a period of about 2 hours. The reaction, which results is exothermic in nature and is accompanied by an increase in temperature from room temperature to near the boiling point of the benzene. A strong frothing and foaming is observed until all of th N-methyl-N-nitroso urea has been added. The reaction vessel is then placed in an oil bath maintained at 130° C., allowing the batch to reflux. Refluxing is continued for about 3 hours. Throughout the reaction the mixture remains in two phases and the vapors of the reaction mixture are alkaline to litmus paper. Thereafter the vessel and contents are cooled to room temperature and the reaction product allowed to settle; after which the benzene phase is decanted. The product is dispersed in about 2 liters of acetone and then poured into 16 liters of methanol under stirring. A white granular polymeric solid is formed which is filtered off and dried. The product exhibits the following rheological properties, softens at about 175° C. under deforming pressure and melts sharply at 193° C. if undisturbed. The X-ray diagram shows sharp defraction lines indicating crystallinity. The infrared absorption spectrum indicates the presence of polyhexane ethylene urea. Fibers are drawn directly from a clear melt of the resin.

Example II

The same equipment as that of Example I is used. To a solution of 198 grams of 4,4'-methylene dianiline provided in 1500 cc. of benzene and maintained at a reflux temperature of 135° C., 91 grams of N-methyl-N-nitroso urea is gradually added over a period of about 2 hours. The mixture is continued under reflux for an additional 2 hours. It is observed that after about 15–20 minutes some haziness develops in the reaction mixture which increases with time. After cooling the reaction mixture to 35–40° C., a soft and porous polymeric material in the form of beads is separated from the benzene by filtration. The beads are then washed with methanol and acetone. The infrared absorption spectrum indicates the presence of poly-p-p'-methylene diphenylene urea. The product can be fused to a clear brown melt at about 145° C. and at this temperature fibers are drawn directly from the melt.

Example III

The same equipment as that of Example I is used. To a dispersion of 248 grams of p,p'-sulfonyl dianiline provided in 1500 cc. of benzene and maintained under reflux temperature, add 91 grams of N-methyl-N-nitroso urea over a perid of about 2 hours. The mixture is refluxed for an additionel 3 hours. The polymeric reaction product separates from the benzene which after cooling is decanted. The reaction product is identified by infrared absorption as containing poly-p-p'-sulphonyl diphenylene urea and exhibits a resinous nature, softens at steam temperature and at this same temperature clear brown resinous fibers are drawn directly from the melt.

Example IV

The same equipment as that of Example I, but with a Stark and Dean receiver interposed between the condenser and the flask to facilitate removal of water of reaction, is charged with 11.6 grams of hexamethylene diamine contained in 100 ccs. of toluene, followed by the addition of 10.5 grams of nitro urea over a period of 1 hour. During the latter addition frothing and bubbling occur together with a slight rise in temperature from room temperature at which the contents are initially maintained. The reaction mixture is then refluxed, the temperature advancing slowly from about 85° C. to about 110° C. The reaction is accompanied by strong frothing and about 4.7 ccs. of water are collected in the receiver. The product which is filtered off is a fine particulate polymeric material having a melting point of about 200° C. The material can be fused at 180–200° C. under slight pressure, the fusing being accompanied by evolution of alkaline vapors.

The present invention is directed to a process for producing improved polymeric ureas and involves provision of a reaction medium containing cyanic acid and a polyamine and inter-reacting the cyanic acid and polyamine. The cyanic acid is provided in situ in the reaction medium as through the decomposition or dissociation of a nitroso urea or nitro urea. It is also possible to produce the cyanic acid elsewhere by conventional means, transfer it to the proper medium and proceed accordingly. However, this latter procedure is complicated requiring elaborate precautions and equipment.

In the prescribed method, the cyanic acid reacts with the polyamine which is present to form an intermediate product which in turn polymerizes to the resulting desired polymeric urea. The reactions determined as taking place can be illustrated using structural formulae.

For convenience the reactions are indicated as taking place in two stages. Stage I is illustrative of the reactions through formation of the intermediate product while Stage II is illustrative of the polymerization of the intermediate product to the desired polymeric urea.

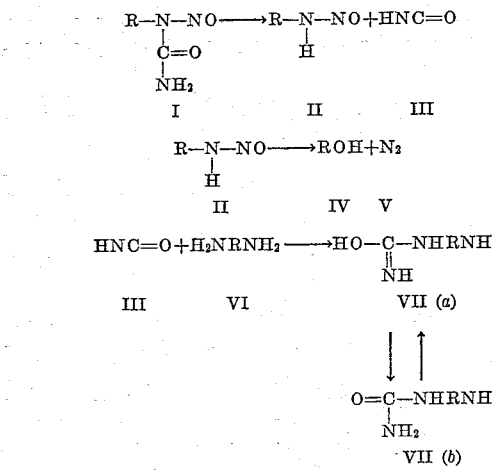

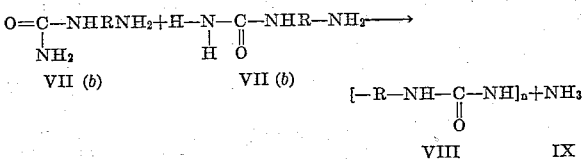

The formulae are directed to situations in which an N-nitroso urea is the starting material rather than the nitro urea.

The process of the present invention has been illustrated in respect to first and second stages. The first stage is directed to the production of intermediate products, which can for convenience be considered monomers. The second step is directed to inter-reacting the intermediate products or monomers to produce the desired polymeric products. In practice, however, the stages are carried out substantially simultaneous to one another after production of the initial reactive quantity of cyanic acid.

In actual practice the process can be exercised by slowly adding a cyanic acid-producing component such as an N-nitroso urea to a polyamine maintained in a quantity of organic solvent such as benzene, toluene, etc. Preferably the polyamine and cyanic acid-producing compound are provided in mol to mol ratio but can be varied as circumstances dictate. The cyanic acid-containing compound decomposes or dissociates to form cyanic acid and thus can be considered as constituting in part the reaction medium. After inclusion of all of the cyanic acid-producing component refluxing is carried on until it is determined that polymeric material exhibiting the desired amount of fusibility has been formed.

In order to provide controlled conditions to the reactions, a solvent, preferably benzene or toluene is provided. The solvent should be inert to the ureas, both those charged to, and those produced by the process. Additionally, the solvents should have boiling points between 60 and 220° C. to allow refluxing. It has been found that benzene and homologues are particularly attractive vehicles for present purposes. It is further preferable that the reactions be maintained under substantially anhydrous conditions, particularly when fusible products exhibiting a minimum of cross-linking are desired.

The ureas which are initially provided in the reaction medium and serve to form cyanic acid are aliphatic, aromatic or alicyclic nitroso ureas and nitro urea. Among the various nitroso ureas which can be used are methyl nitroso urea, ethyl nitroso urea, propyl nitroso urea, isopropyl nitroso urea, and butyl nitroso urea; also phenyl nitroso urea, toluyl nitroso urea, benzyl nitroso urea, and cyclohexyl nitroso urea. Preference is directed to aliphatic nitroso ureas with the further preference directed to N-methyl-N-nitroso urea.

The polyamines which can be provided in the reaction medium are any of the primary and secondary aliphatic and aromatic diamines and polyamines and mixtures thereof. When a polymeric polyurea product exhibiting a minimum of cross-linking is desired, diamines have been found the more attractive. Illustrative of polyamines that can be used are those disclosed in the examples, i.e., 1,6-hexane diamine, 4,4'-methylene dianiline, p,p'-sulfonyl dianiline. In addition, the following can be used: ethylene diamine, 1-3 propylene diamine, 1-4 butylene diamine, 1-5 pentamethylene diamine, 1-6 hexamethylene diamine, etc. and their isomers exhibiting bifunctionality as primary amine groups; also, methylene dianiline, ethylene dianiline, propylene dianiline, etc., and mixtures thereof.

The formulae set forth earlier indicate in part the advantages resulting from utilization of the present process. In particular, Product II is shown in Stage I dissociating into an alcohol (IV) and nitrogen (V), neither of which interferes with the formation of polymers. Consequently, the compositions and characteristics of the polymers can be predicted with a measure of certitude not enjoyed by previously known processes. In addition, the process excluded the formation of biuret products and therefore the proneness to cross-linking, which is undesirable particularly when coating compositions are to be provided.

As indicated, the polyureas obtainable from exercise of the present process are useful in the production of fibers, filaments and films, which can be, as previously indicated in the examples, drawn directly from melts of the polymeric materials. In addition, by being of a fusible nature they lend themselves admirably to laminating coating applications which can be converted to the infusible form, after their deposition on various substrates, through the simple expedient of heat curing. The polymeric ureas available through exercise of the present process can be blended with polyamides, polyurethanes and the like to produce other attractive products.

It will thus be seen that the objects set forth above, among those made apparent from the preceding description, are efficiently attained and, since certain changes may be made in carrying out the above process, without departing from the spirit and scope of the invention, it is intended that all matter contained in the above description shall be interpreted as illustrative and not in a limited sense.

What is claimed is:

1. A process for producing linear polymeric ureas which is carried out in a substantially anhydrous reaction medium comprising a cyanic acid-producing compound selected from the class consisting of lower alkyl nitroso ureas, aromatic nitroso ureas, cycloalkyl nitroso ureas and nitro urea and a diamine having less than ternary substitution on the amine radicals thereof, in an inert organic solvent for said diamine the said solvent having a boiling point of between 60–220° C. and wherein (a) cyanic acid is produced in situ in said medium from said cyanic acid-producing compound, and (b) the said cyanic acid interreacts with the said diamine to produce an intermediate product (c) which intermediate product then polymerizes to produce the said linear polymeric urea, the said process being carried out while maintaining the said reaction medium under reflux conditions.

2. A process according to claim 1 wherein the diamine is hexamethylene diamine.

3. A process according to claim 1 wherein the diamine is 4,4-methylene dianiline.

4. A process according to claim 1 wherein the diamine is P,P′-sulfonyl dianiline.

5. A process for producing linear polymeric ureas which is carried out in a substantially anhydrous reaction medium comprising a lower alkyl nitroso urea and a diamine having less than ternary substitution on the amine radicals thereof, in an inert organic solvent for said diamine, the said solvent having a boiling point of between 60–220° C. and wherein (a) cyanic acid is produced in situ in said medium by decomposition of the said aliphatic nitroso urea, and (b) the said cyanic acid interreacts with the said diamine to produce an intermediate product (c) which intermediate product then polymerizes to produce the said linear polymeric urea, the said process being carried out while maintaining the said reaction medium under reflux conditions.

6. A process according to claim 2 wherein the lower alkyl nitroso urea is N-methyl N-nitroso urea.

7. A process for producing linear polymeric ureas which is carried out in a substantially anhydrous reaction medium comprising nitro urea and a diamine having less than ternary substitution on the amine radicals thereof, in an inert organic solvent for said diamine, the said solvent having a boiling point of between 60–220° C., and wherein (a) cyanic acid is produced in situ in said medium from said cyanic acid-producing, and (b) the said cyanic acid interreacts with the said diamine to produce an intermediate product (c) which intermediate product then polymerizes to produce the said linear polymeric urea, the said process being carried out while maintaining the said reaction medium under reflux conditions.

References Cited in the file of this patent

UNITED STATES PATENTS

| | | |
|---|---|---|
| 2,683,696 | Muller et al. | July 13, 1954 |
| 2,820,024 | Kerk | Jan. 14, 1958 |

FOREIGN PATENTS

| | | |
|---|---|---|
| 51,510 | Netherlands | Nov. 15, 1941 |
| 907,413 | Germany | Mar. 25, 1954 |
| 927,657 | Germany | May 12, 1955 |

OTHER REFERENCES

Boivin et al.: "Chemical Abstracts," p. 2502, vol. 46 (1952), an abstract from "Canadian Jour. of Chemistry," vol. 29 pp. 478–81, 1951.

Ser. No. 383,040, Moldenhauer et al. (A.P.C.) published Apr. 20, 1943.

UNITED STATES PATENT OFFICE
CERTIFICATE OF CORRECTION

Patent No. 3,006,898                          October 31, 1961

Henry A. Walter

It is hereby certified that error appears in the above numbered patent requiring correction and that the said Letters Patent should read as corrected below.

Column 1, line 55, for "th" read -- the --; column 2, line 28, for "perid" read -- period --; line 29, for "additionel" read -- additional --; column 6, under the heading "UNITED STATES PATENTS" add -- 2,888,438 Katz----May 26, 1959 --.

Signed and sealed this 1st day of May 1962.

(SEAL)
Attest:

ERNEST W. SWIDER
Attesting Officer

DAVID L. LADD
Commissioner of Patents